No. 872,558. PATENTED DEC. 3, 1907.
J. B. CROCKETT.
WIRE STRETCHER.
APPLICATION FILED JULY 14, 1906.

2 SHEETS—SHEET 1.

Witnesses
C. R. Thomas
F. G. Smith

Inventor
J. B. Crockett
By Chandler & Chandler
Attorneys

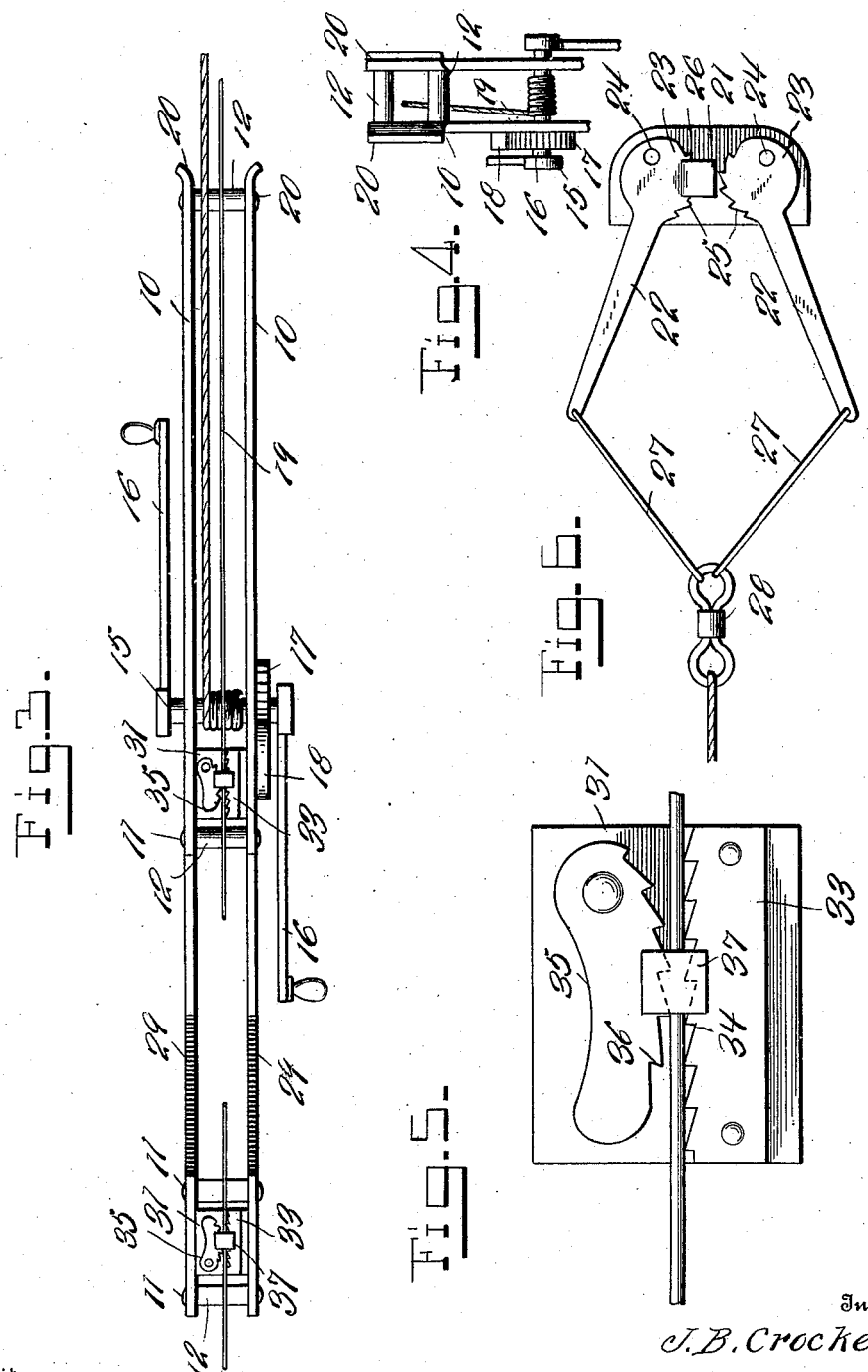

UNITED STATES PATENT OFFICE.

JAMES B. CROCKETT, OF GLENDIVE, MONTANA.

WIRE-STRETCHER.

No. 872,558.　　　　Specification of Letters Patent.　　　　Patented Dec. 3, 1907.

Application filed July 14, 1906. Serial No. 326,224.

*To all whom it may concern:*

Be it known that I, JAMES B. CROCKETT, a citizen of the United States, residing at Glendive, in the county of Dawson and State of Montana, have invented certain new and useful Improvements in Wire - Stretchers; and I do hereby declare the following to be a full, clear, and exact description of the invention, such as will enable others skilled in the art to which it appertains to make and use the same.

This invention relates to wire stretchers and has for its object to provide a simple construction of wire stretcher which will be efficient in action and which will include means for holding the ends of the line wires so they may be joined.

Broadly speaking the invention comprises a pair of plates which have a series of wire grips, one of which is connected with a cable which is wound upon a windlass, the other grips being so disposed one upon each side of alining recesses in the plates as to hold the meeting ends of two wires while the same are joined.

Figure 1:
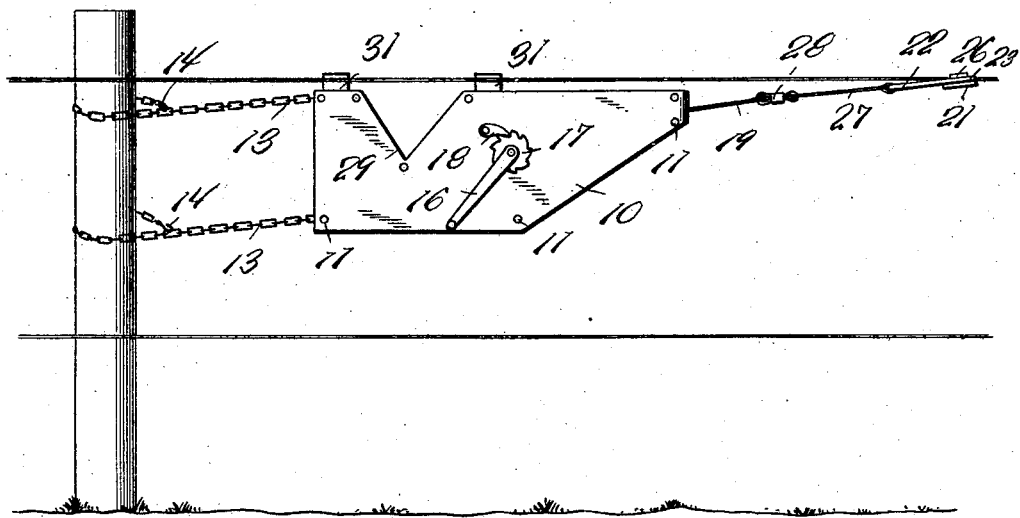
Figure 2:
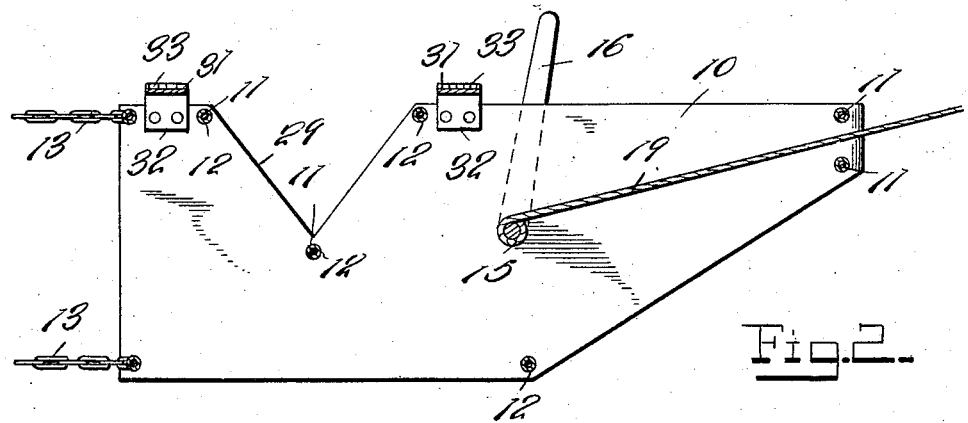

In the accompanying drawings: Figure 1 is a side elevation of the invention in use. Fig. 2 is a detail vertical longitudinal sectional view therethrough. Fig. 3 is a plan view thereof. Fig. 4 is an end view. Fig. 5 is a detail view of a portion of the device showing the manner of using the same when it is desired to join two wires. Fig. 6 is a detail plan view of one of the wire grips.

The stretcher comprises a pair of plates 10 which are identical in form and which are connected by means of bolts 11 which are engaged through the plates along their edges, the said plates being held in spaced relation by means of spacing sleeves 12 which are engaged upon the bolts intermediate the said plates. Two of the bolts 11 are engaged through the upper and lower rear end corners of the plates and connected to each of these bolts is one end of a chain 13 which is provided at its free end with a hook 14 which is designed for engagement in one of the links in its respective chain to form a loop for engagement around a fence post. This construction forms a means for holding the device while stretching the line wires of a fence and in order that the line wires may be stretched, I provide a shaft 15 which is journaled for rotation in the plates, extends transversely of the same, and is provided at each of its ends with a crank 16 by means of which it may be rotated. The shaft is also provided, outwardly of one of the plates and intermediate the same and the adjacent crank-handle with a ratchet wheel 17 there being a pawl 18 pivoted upon the said plate above the ratchet in position for engagement with the same to prevent backward rotation of the shaft. A cable 19 is wound upon the shaft and extends between the plates and beyond the forward edges thereof between a pair of the bolts 11, the said edges of the plates at this point being curved away from each other as at 20 to prevent wearing of the cable. To the end of the cable is connected a wire gripping device which will now be described.

The gripping device comprises a plate 21 and a pair of jaws 22 which have cam heads 23, the said jaws being pivoted at their heads 23 eccentrically to the plate 21 as at 24 and provided along the opposing edges of their heads with serrations 25, it being understood that the line wire which is to be stretched is engaged between the said edges of the jaw-heads. To prevent slipping of the wire from such engagement, I provide upon one of the jaw heads an upstanding lip 26 which overlies the adjacent edge of the other jaw head. To the ends of the jaws 22 are connected links 27 which are connected at their opposite ends to one member of a swiveled link 28, the free end of the cable 19 being connected to the other member of the link 28.

It will be readily understood from the foregoing that when the chains 13 are engaged with a post and the grip above described with a line wire and the shaft 15 rotated, the line wire will be stretched.

In order that the device may be used to hold the meeting ends of two wires while the same are being spliced, I form in the upper edges of the plates alining recesses 29 and upon the said edges of the plate at each side of the recesses therein I secure gripping members which serve to hold the said ends of the wires, it being understood that the recesses permit free use of a suitable wire splicing tool. Each of the said gripping members comprises a plate 31 which is provided at its sides with right angularly extending flanges 32 which are riveted or otherwise secured to the plates against which they lie. Upon each of the plates 31 is secured a cleat 33 having a serrated edge 34 and pivotally mounted upon each plate in position to cooperate with the cleat 34 thereon is a jaw 35 having a serrated cam edge 36, opposing the serrated edge of the cleat 33, and a lip 37 which overlies a portion of the cleat 33 as in the case of the lip 24 on the jaw 22. The gripping members just described have their jaws opposing each other and it will be readily seen that the meeting ends of two wires may be held thereby while being spliced.

It is to be understood that I do not desire to be limited to the exact details of construction shown and described, for obvious modifications will occur to a person skilled in the art.

What is claimed is:

1. A device of the class described comprising a pair of plates connected in spaced parallel relation, the plates being provided at corresponding points in their upper edges with recesses, and having their forward ends curved outwardly, a wire gripping device arranged at each side of the recesses in the plates and adapted to grip the end portions of wires to be spliced, a shaft journaled in the plates, a crank handle connected with the shaft whereby the same may be rotated, a ratchet carried by the shaft, a pawl carried by one of the plates and resting normally in engagement with the ratchet, a cable connected with the shaft and adapted to be wound thereon when the shaft is rotated, said cable being extended between the outwardly curved forward ends of the plates, and a wire gripping device carried at the end of the cable.

2. A device of the class described comprising a pair of plates connected in spaced parallel relation, the plates being provided at corresponding points in their upper edges with recesses, and having their forward ends curved outwardly, a wire gripping device arranged at each side of the recesses in the plates and adapted to grip the end portions of wires to be spliced, a shaft journaled in the plates, a crank handle connected with the shaft whereby the same may be rotated, a ratchet carried by the shaft, a pawl carried by one of the plates and resting normally in engagement with the ratchet, a cable connected with the shaft and adapted to be wound thereon when the shaft is rotated, bolts connecting the plates at their outwardly curved forward ends, and a cable connected with the shaft and adapted to be wound thereon when the shaft is rotated, said cable being extended between the bolts and the said outwardly curved forward ends of the plates, and a wire gripping device carried at the end of the cable.

In testimony whereof, I affix my signature, in presence of two witnesses.

JAMES B. CROCKETT.

Witnesses:
T. F. HAGAN,
JOHN O'NEEL.